C. E. MEAD.

EXPLOSIVE ENGINE.

APPLICATION FILED MAY 8, 1911.

Reissued Feb. 13, 1912.

13,368.

4 SHEETS—SHEET 1

Witnesses

J. L. Cochrane

F. W. Schaefer.

Inventor

Cyrus E. Mead.

By Toulmin & Reed,

Attorneys.

C. E. MEAD.

EXPLOSIVE ENGINE.

APPLICATION FILED MAY 8, 1911.

Reissued Feb. 13, 1912.

13,368.

4 SHEETS—SHEET 2.

Witnesses

T. L. Mechanic

E. Schaefer

Inventor

Cyrus E. Mead,

By Toulmin & Reed,

Attorneys

C. E. MEAD.
EXPLOSIVE ENGINE.
APPLICATION FILED MAY 8, 1911.
Reissued Feb. 13, 1912.
13,368.
4 SHEETS—SHEET 3.
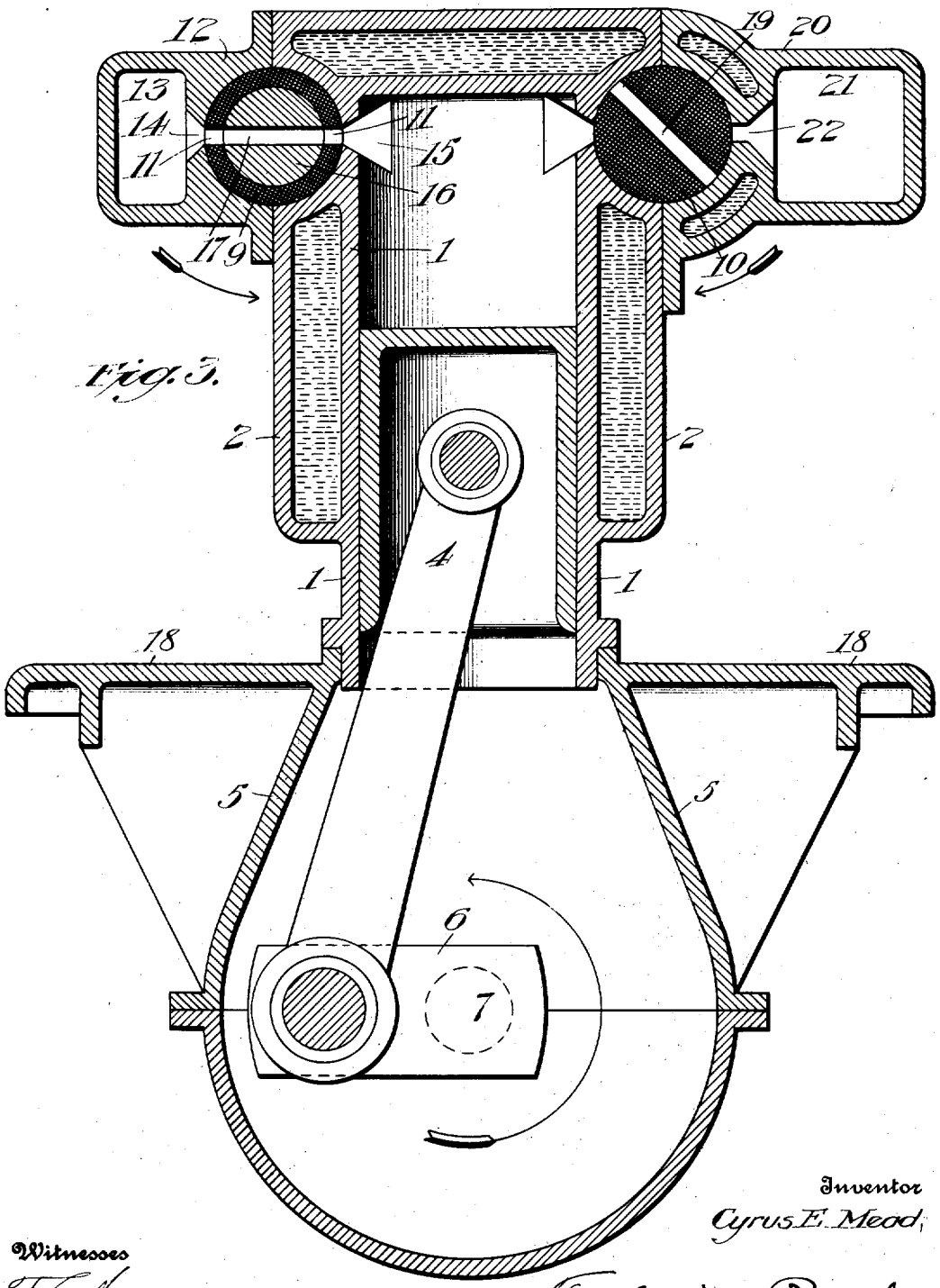
Witnesses
T. L. Mockane
F. W. Schaefer.
Inventor
Cyrus E. Mead,
By Toulmin & Reed,
Attorneys.

C. E. MEAD.

EXPLOSIVE ENGINE.

APPLICATION FILED MAY 8, 1911.

Reissued Feb. 13, 1912.

13,368.

4 SHEETS—SHEET 4.

Inventor

Cyrus E. Mead,

Witnesses

T. L. Mochran

G. W. Schaefer.

By Toulmin & Reed,

Attorneys.

UNITED STATES PATENT OFFICE.

CYRUS E. MEAD, OF DAYTON, OHIO, ASSIGNOR, BY DIRECT AND MESNE ASSIGNMENTS, TO THE MEAD ENGINE COMPANY, OF DAYTON, OHIO, A CORPORATION OF OHIO.

EXPLOSIVE-ENGINE.

13,368. Specification of Reissued Letters Patent. Reissued Feb. 13, 1912.

Original No. 921,264, dated May 11, 1909, Serial No. 423,094. Application for reissue filed May 8, 1911. Serial No. 625,903.

*To all whom it may concern:*

Be it known that I, CYRUS E. MEAD, a citizen of the United States, residing at Dayton, in the county of Montgomery and State of Ohio, have invented certain new and useful Improvements in Explosive-Engines, of which the following is a specification, reference being had therein to the accompanying drawings.

This invention relates to new and useful improvements in explosive engines, and more specifically to the arrangement and operation of the various valves controlling the admission and exhaust to and from the engine.

The objects of the invention are several, principal among which is the provision of rotary inlet and exhaust valves independent of and distinct from each other and each having a through-and-through port, with means to impart rotary motion to each valve from an operative part of the engine; and means for operating said valves so that the engine may be placed in a position to be reversed, and the provision of means through and by which the turning of the valves may take place while the engine is in operation, and to provide further means through and by which the engine may be throttled at the inlet valve.

Other objects and advantages appertaining to the construction and operation of the engine will be referred to in the general description to follow.

Preceding such general description reference is made to the accompanying drawings, of which—

Figure 1:
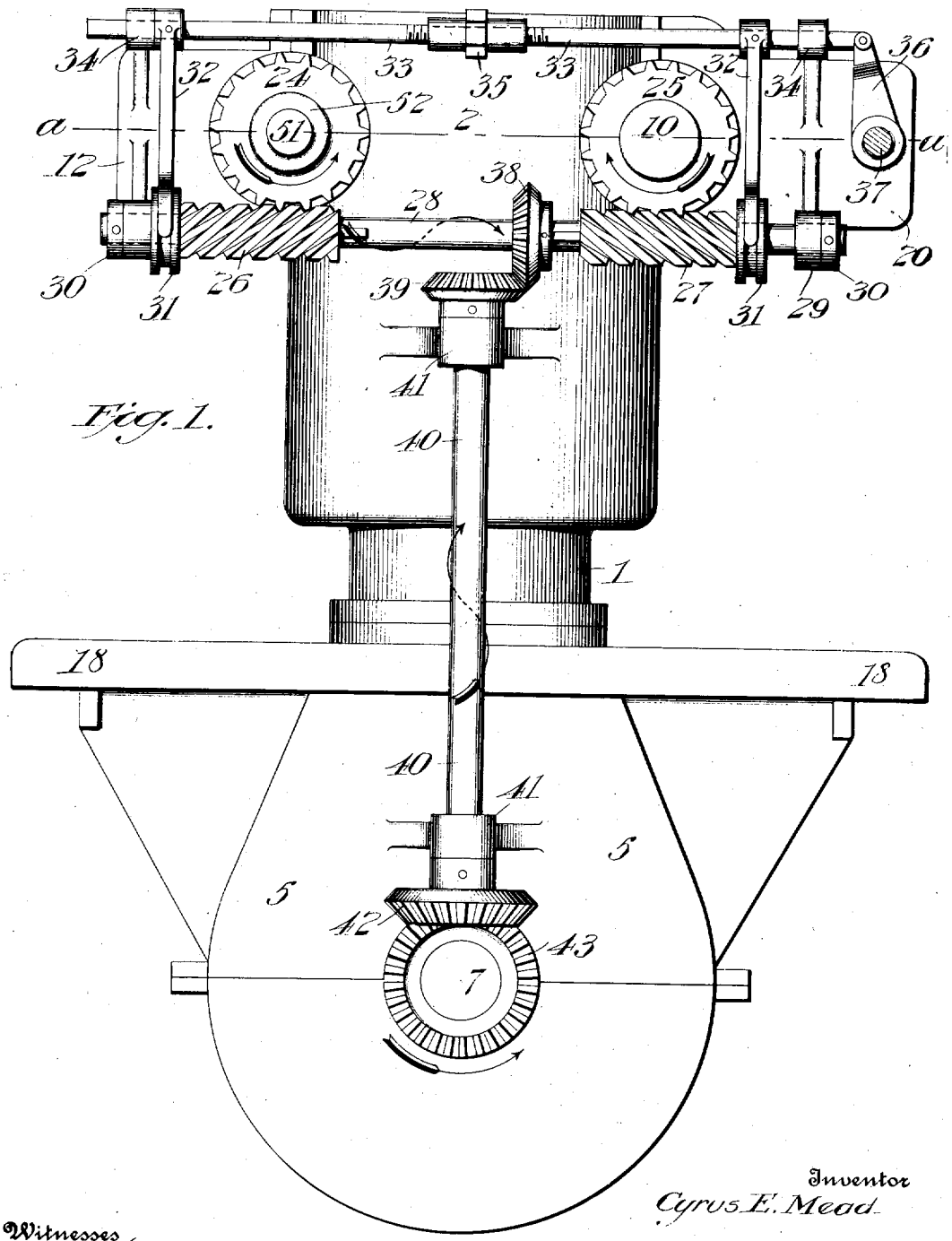
Figure 2:
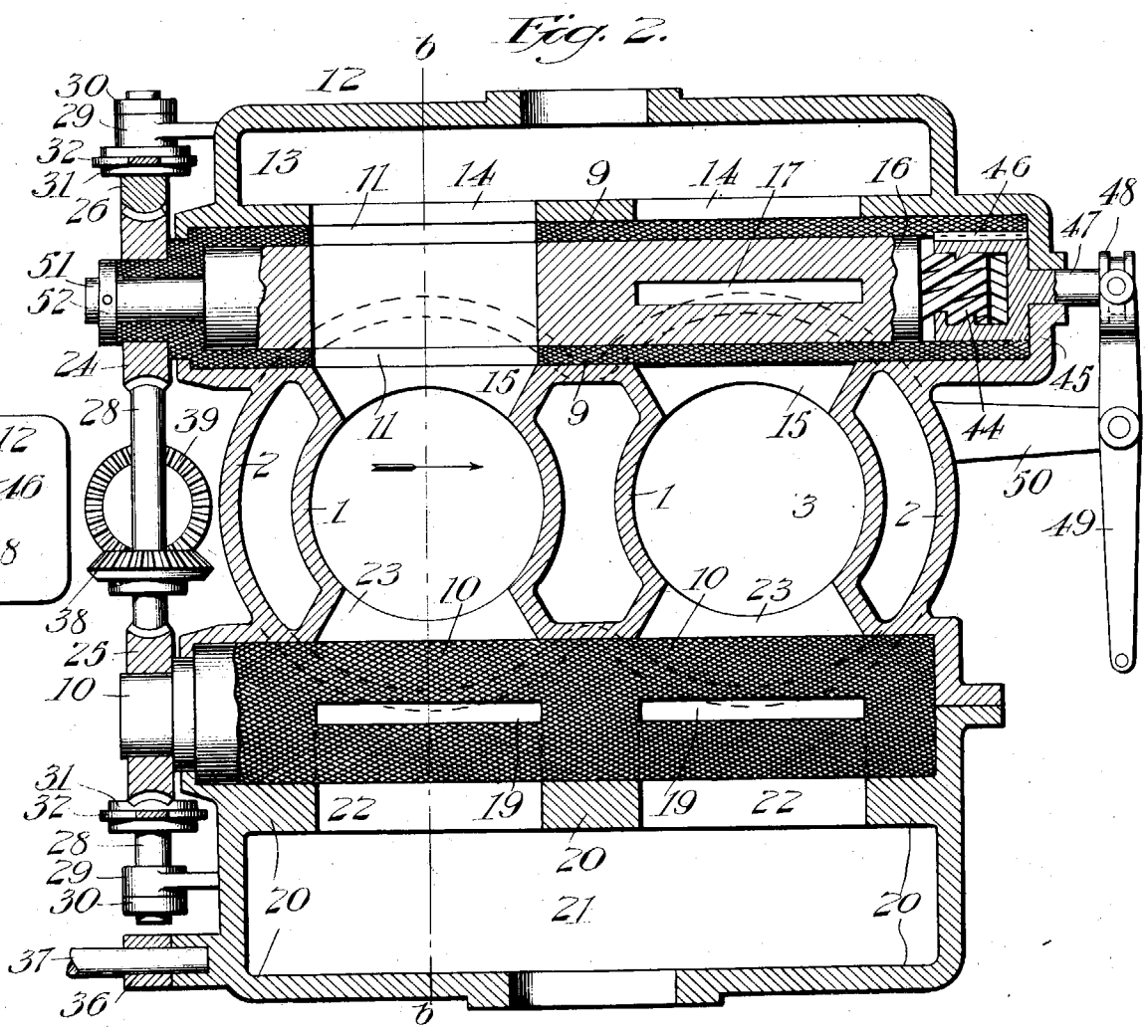
Figure 7:
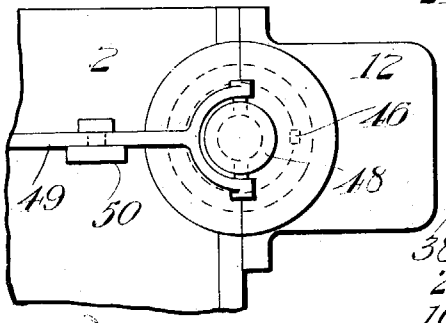
Figure 4:
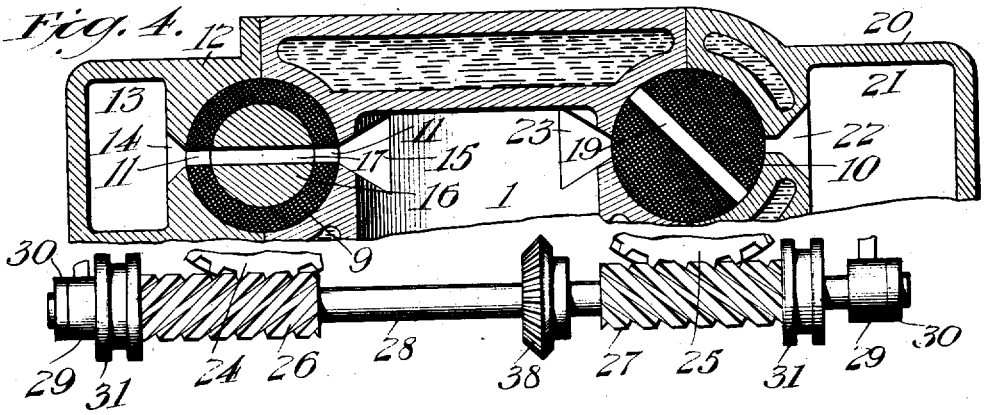
Figure 5:
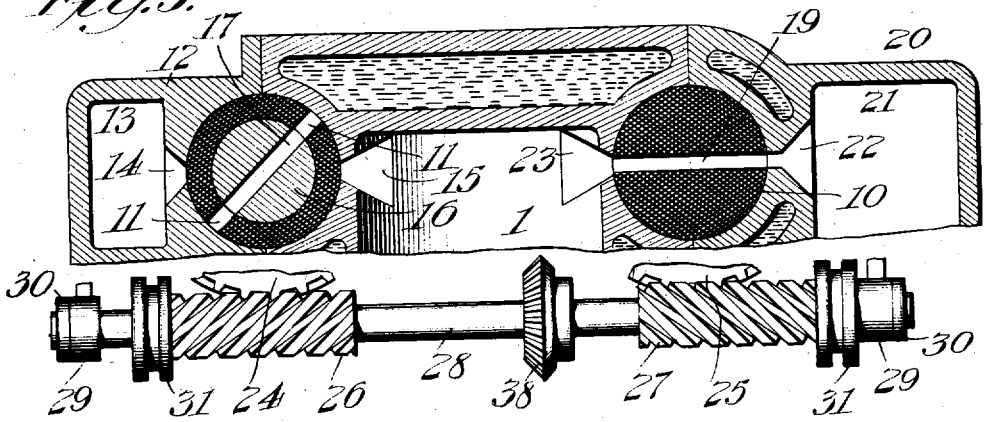
Figure 6:
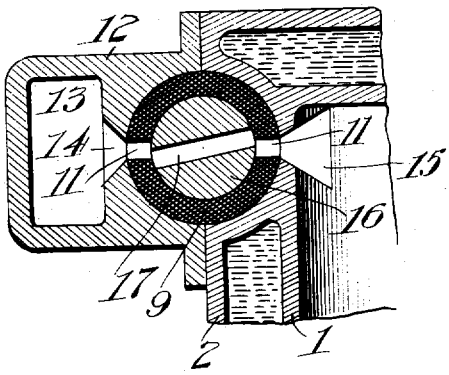

Figure 1 is an end elevation of my improved explosive engine. Fig. 2 is a horizontal sectional view of the same on the line *a a* of Fig. 1. Fig. 3 is a vertical sectional view of the same on the line *b b* of Fig. 2. Figs. 4 and 5 are diagrammatic views showing the means for reversing the engine. Fig. 6 is a cross sectional view of the inlet valve showing the means for throttling the same. Fig. 7 is a detail view of the means through which the devices for throttling the valve are actuated.

Throughout the specification similar reference characters indicate corresponding parts, as illustrated in the drawings.

*Well-known parts of gas engine construction.*—In the drawings, I have illustrated a two cylinder four cycle engine, but of course it will be understood that my improvements are not alone confined to that type of engine. 1 designates the cylinders of such type of engine provided with the usual water jackets 2. The cylinders are mounted upon a crank case 5 having extended brackets 18 which constitute the engine support. Revolving in the crank case 5 are two cranks 6 which are joined to the engine shaft and have crank pins 8 which connect with the pitmen 4 which extend to the pistons 3. Thus movement is imparted to the engine shaft 7 through the cranks when the explosive mixture is ignited behind the pistons.

The foregoing means, together with the ignition devices, may consist of any of the well-known mechanism common to explosive engines.

*The rotary valves.*—Mounted in a suitable pocket on the left hand side of each cylinder, is a rotary inlet valve 9 held in position by a cap 12 and having a port 11 which registers with the port 15 of its respective cylinder, and with the port 14 of the explosive fluid passage-way 13 in the cap 12. The port 11 is through-and-through the valve 9. The pocket and cap referred to are merely one form of valve casing, but any suitable casing is all that is needed. The passage-way 13 communicates with the carbureter (not shown). It will be borne in mind that upon each complete rotation of the valve 9, the port 11 thereof will register twice with the ports 14 and 15. Similarly mounted on the right hand side of each cylinder is an exhaust valve 10 held in position by the water jacket cap 20, and provided with a port 19 which registers with the port 23 of the cylinder, and with the port 22 of the exhaust passage-way 21 in the cap 20. Again it will be understood that the cap 20 and the remainder of the bore for the valve 10 are but one form of valve casing. The port 19 of the valve 10 is also through-and-through, as in the case of the port 11 in valve 9. In a manner similar to the inlet valve, the port 19 will register twice with the ports 22 and 23 on each complete revolution of said exhaust valve 10. This feature of each valve registering twice with its ports in making one revolution, is accomplished by the through-and-through arrangement of the ports. The inlet valve 9 and the exhaust valve 10 of each cylinder rotate in opposite directions as shown by the arrows in Figs. 1 and 3, through the mechanism shown in Fig. 1, which comprises worm or spiral gears 24 and 25 mounted on the inlet valve 9 and the exhaust valve 10. The gear 24 meshes with the left hand screw gear 26, while the gear 25 meshes with the right hand threaded screw gear 27. A four to one ratio of movement is imparted to the gears 24 and 25 by the gears 26 and 27; the two latter gears being left and right hand, the inlet and exhaust valves will rotate in opposite directions. These gears 26 and 27 are splined upon the common shaft 28 having bearings in brackets 29 and held against horizontal movement by collars 30. Mounted upon said shaft 28 is a miter gear 38 meshing with a similar gear 39 on a vertical shaft 40 which rotates in suitable bearings 41. A miter gear 42 is on the lower end of the vertical shaft 40, and such gear is in mesh with a similar gear 43 which is on the main crank shaft 7. Through this train of gearing one revolution is imparted to the shaft 28 upon each revolution of the main shaft 7, and as a consequence, the rotary valves and said main shaft will be given a four to one ratio of movement. This mechanism constitues one exemplification of motion-transmitting devices, but this does not exclude the use of other motion-transmitting devices as incident to this invention.

It will be seen that as each valve opens twice to each revolution, their speed may be low, and very low compared with the speed of the main engine shaft, and that consequently wear on these valves and in the bore of their casings is reduced to a negligible quantity, and thus the life of the structure greatly lengthened and the efficiency of the valves as such enhanced; leakage or the tendency to leakage is reduced to the minimum and the necessity for lubrication lessened, and withal, most durable and efficient valves are produced.

Among the results or advantages flowing from the independence of my inlet and exhaust valves, may be stated the following: It is of first importance that the clearance between a rotary valve and its casing or seat shall be in proportion to the temperature the valve may undergo in use. The clearance for a valve whose working temperature is relatively low would not be sufficient for a valve whose working temperature is relatively high, and vice versa, as in the case of explosive engine valves, wherein the "sucking" of air and gasolene through the inlet-valve produces extreme cold, reducing the temperature of the valve and causing the contraction thereof, while at the same time the highly heated exploded charges passing out through the exhaust valve raises its temperature and causes the expansion thereof. Hence if two such valves, or two such ports, inlet and exhaust, are in one structure or are integral, the one portion will contract as compared with the size of the bore of its casing and the other will expand as compared therewith, and thus the one will leak, or tend to leak, and the other to stick, or tend to stick. It is to avoid these serious difficulties that the principal or first object of my invention relates by making the inlet valve and the exhaust valve independent, each occupying its own distinct casing, the clearance between the high temperature valve and the bore of its casing being thus permitted to be, as practice requires, substantially double that which is required for the clearance of the low temperature valve. Again by the independence of the valves the size or length of the port in each valve may be more than twice the size or length of two ports in a single valve for the same diameter of cylinder. Thus, in the case of my improved independent valves the inlet valve port may be of length substantially equal to the diameter of the bore of the cylinder, and likewise the length of the port of the exhaust valve may be substantially equal to such diameter of the cylinder, whereas, if the inlet and exhaust ports were in a single valve, the length of each port would have to be shortened to less than half of such diameter because of the necessary intervening partition between the ports. Still again, in the case of both the inlet and the outlet ports in the same valve, their proximity renders it difficult, if not impossible, to prevent the fresh charge of explosive from getting over into the exhaust port, and, on the other hand, to prevent the exhaust products from getting over into the inlet port. One result of this crossing over of the gases is that the ignited gases crossing over into the fresh gases cause the latter to ignite and explode at an improper time.

By my independence of the valves the difficulties and the advantages here related are respectively avoided and obtained, in addition to the capacity for adjusting the relative position of the port of the one valve as compared with the position of the port of the other.

As before stated, the engine is designed for four cycles, therefore, in the positions in which the valves and pistons are shown in Fig. 3, the engine has received about one-half of its charge of explosive mixture. When the piston 3 there shown, has reached the limit of its downward stroke, the engine has received the full charge of mixture and the inlet valve will be closed. At such time, the piston ascends, (both valves being closed) the mixture is compressed and is then ignited to force the piston downwardly. When said piston reaches the end of its downward stroke and begins to ascend, the port 19 in the exhaust valve 10 begins to register with the port 23, thereby allowing the burned gases to escape. While the piston is ascending, the exhaust valve is opened and closed at the end of the upward stroke, and the piston descends drawing in its next charge, the port 11 registering with the port 15 as shown in Fig. 3. It will be noted that the exhaust port 19 in the exhaust valve 10 lies substantially at an angle of 135 degrees to the inlet port 11 of the inlet valve 9. This is a theoretical angle, however, which may be found necessary to vary in actual practice. The means for obtaining this variation will be hereinafter described.

*Means for reversing the engine.*—The screw gears 26 and 27 are as before stated, splined to the shaft 28. These gears are provided on their outer ends with grooved spools 31 which are engaged by the lower ends of arms 32, the upper ends of said arms being fastened to a slidable rod 33 having bearings in brackets 34 on the water jacket cap 20. The rod 33 is given longitudinal movement from a crank 36 on a rock shaft 37, which latter shaft may be attached to any suitable means manually operated. It will be seen that if the shaft 37 is rocked, the gears 26 and 27 will slide along the shaft 28 thereby rocking the inlet and exhaust valves concurrently and in the same direction. The movement imparted to the gears 24 and 25 by the screw or spiral gears 26 and 27, is similar to that of a rack and pinion. In the position the valves and screw gears are shown in Figs. 3 and 4, the piston has drawn in a charge and the engine may be "cranked" and started in the direction indicated by the arrows Figs. 1 and 3, but, if the gears 26 and 27 are moved along the shaft 28 to the right, the inlet valve and the exhaust valve will be rocked one-eighth of a revolution to the position shown in Fig. 5. It will be seen that the port 19 of the exhaust valve will be in its intermediate position with reference to the port 23, and the piston 3 will be in its intermediate position of exhausting the burned gases. The engine may be then "cranked" and started in the reverse direction to that shown by the arrows in Figs. 1 and 3. The rocking of the valves 9 and 10, it will be understood, does not reverse the engine, but places the engine in a position to be reversed.

*Means for varying the timing of the valves.*—It has been stated that the engine as shown and described illustrates theoretical conditions in which the exhaust is 135 degrees behind the admission. Owing to the high speed of the smaller type of engine, such as are used for driving automobiles and the like, and owing to the various explosive mixtures used, it is necessary that this angle may be varied, and it is also advantageous to make the necessary adjustment while the engine is running as at such time the adjustment may be done more accurately. In view of these conditions, means are provided for so obtaining the necessary adjustments, comprising a turn buckle 35 on the slidable rod 33; the rotation of this turn buckle in one direction will draw the arms 32 toward each other rocking the valves to a small extent in opposite directions, and decreasing the angle between the port 11 in the inlet valve and the port 19 in the exhaust valve. A rotation of the turn buckle in the opposite direction will of course impart a movement to the arms 32 that will draw them apart, and the angle between the ports will necessarily be enlarged. This adjustment does not affect the reversing mechanism owing to the fact that the angle between the valves is the same when they are rotating in either direction. When the adjustment is being made the gears 26 and 27 act as racks and the gears 24 and 25 act as pinions as is the case when the valves are being reversed. The mechanism here described may be used to rock both valves and so change the relative angle of their ports, or may be used to rock one of the valves without rocking the other. For instance, if either section of the rod 33 be held while the turn buckle 35 is rotated, then the other section alone will move and the valve connected to it will alone be adjusted. To illustrate: if the rock shaft 37 remains in its normal state, as it is when not manually operated, which means that it is locked, and the turn buckle 35 is operated under such conditions, then the inlet valve 19 will alone be adjusted, say, to open sooner or later on the suction stroke, or to close sooner or later, as compared with the movement of the engine piston past the lower dead center. This explanation is made to more fully bring out the inherent capacity of the mechanism, of the form illustrated, for rocking the valves or either of them.

*Means for throttling the engine.*—Extending through the inlet valve 9 is a throttle valve 16 having a port 17 which registers with the port 11 of said inlet valve. This throttle valve rotates normally with the inlet valve, but it may be rotated independently of the inlet valve to a slight extent to throttle the engine—see Fig. 6. The throttle valve 16 is provided with an extension 51 (Fig. 1) which passes through the end of the valve 9, and to which is attached a collar 52 that provides means for preventing horizontal movement of said throttle valve 16. The other end of said throttle valve is provided with an extension 44 which is threaded and receives an interiorly screw-threaded nut splined to the valve 9 by a feather 46. The nut 45 is given horizontal movement to rotate the throttle valve in relation to the inlet valve 9 through a lever 49 pivoted to a bracket 50 and engaging the spool 48 on the stem 47 projecting from said nut 45. The exhaust valve 9 and the throttle valve 16, as before stated, normally rotate together through the threaded extension 44, the nut 45 and the feather 46, but the throttle valve may be given a slight rotation relatively to the exhaust valve to throttle the engine by means of the lever 49 which acts directly upon the nut 45 as hereinbefore stated.

Having thus fully described my invention, what I claim as new and desire to secure by Letters Patent is:—

1. In an explosive engine, the combination with a cylinder having pockets and ports therein, a piston, a main shaft, and a connection between said piston and said main shaft, of a rotary inlet valve, a rotary exhaust valve, said valves being independent of each other and provided with ports adapted to register with the ports in the cylinder, caps having ports adapted to register with the valve ports, an independent shaft for each of said valves, a driving shaft common to said valve shafts, gears interposed between the valve shafts and said common shaft, and means for actuating the common shaft from the main shaft of the engine.

2. In an explosive engine, a cylinder having ports therein, a piston, a main shaft connected with the piston, a rotary inlet valve, a rotary exhaust valve, both of which have ports adapted to communicate with the ports in the cylinder, means for rotating said valves concurrently with the main shaft, and means for rocking said valves simultaneously with and independently of their rotation to change the timing of the valve ports and the cylinder ports to enable the engine to be reversed.

3. In an explosive engine, a cylinder having ports therein, a rotary inlet valve and a rotary exhaust valve having ports adapted to register with the ports in the cylinder, means for rotating said valves, and means for rocking said valves to change the timing of the regulation of said valve ports and the cylinder ports so that the engine may be reversed.

4. In an explosive engine, a cylinder having ports therein, a piston within said cylinder, a main crank shaft driven from said piston, rotary valves mounted on said cylinder and having ports therein and gears thereon, said ports registering with the ports in the cylinder, a shaft common to said valves and driven from the main crank shaft through suitable connections, gears splined to said common shaft and in mesh with the gears on said rotary valves, and means for sliding the gears on said common shaft to rock the valves independently of their rotation.

5. In an explosive engine, a cylinder having ports therein, a piston, a crank shaft driven from said piston, rotary valves mounted on said cylinder and provided with ports, the port in one of said valves being at an angle to the port of the other of said valves, means for driving said rotary valves from said crank shaft, and means for varying the angles of the ports in said valves.

6. In an explosive engine, a cylinder having ports therein, a piston, a crank shaft driven from said piston, rotary valves having ports therein and gears thereon, said ports being adapted to communicate with the cylinder ports, a shaft common to said valves, gears on said shaft in mesh with the gears on the valves, and means for varying the distance between the gears on said common shaft, and means for rotating said common shaft from the main shaft of the engine to rotate said valves.

7. In an explosive engine, a cylinder having ports therein, a piston, a crank shaft driven from said piston, rotary valves mounted on said cylinder, means for rotating the valves from the crank shaft to bring the ports in the valves in registration with the ports in the cylinder, the port in one of said valves being at an angle with the port of the other valve, and means for varying the angle between said valve ports.

8. In an explosive engine, a cylinder having ports therein, a piston, a crank shaft driven from said piston, a rotary inlet valve and a rotary exhaust valve mounted upon said cylinder and having ports adapted to register with the ports in the cylinder, means for rotating said valves from the crank shaft, a throttle valve mounted within the inlet valve and having a port adapted to register with the port of the inlet valve, and means connected to the inlet valve and engaging the throttle valve for independently rotating said throttle valve with relation to the inlet valve to throttle the engine.

9. In an explosive engine, a cylinder having ports therein, a rotary inlet valve and a rotary exhaust valve mounted upon said cylinder and having ports adapted to register with the ports in the cylinder, means for rotating said valves from the crank shaft of the engine, a throttle valve incased in the inlet valve and having a port registering with the port in said inlet valve, and means splined to said inlet valve and engaging the throttle valve for varying the opening of the port of said inlet valve.

10. In an explosive engine, a cylinder having ports therein, a piston, a crank shaft driven from said piston, a rotary inlet valve and a rotary exhaust valve mounted upon said cylinder, said valves having ports registering with the ports in the cylinder, means for rotating said valves from the crank shaft, a throttle valve mounted within the inlet valve and having a port registering with the port in the inlet valve, means for preventing horizontal movement of said throttle valve, a nut splined to said inlet valve and engaging a screw-threaded portion of the throttle valve, and means for shifting said nut to rock said throttle valve.

11. In an explosive engine, the combination, with an engine cylinder having an inlet port and an exhaust port, separated from and independent of each other, of independent separated rotary valves each having a through-and-through port, one valve for the inlet port and one for the exhaust port of the cylinder, and means continuously connecting said valves with the engine shaft to impart constant rotary motion to them.

12. In an explosive engine, the combination, with an engine cylinder having an inlet port and an exhaust port separated from and independent of each other, of independent separated rotary valves each having a through and through port, one valve for the inlet port and one for the exhaust port of the cylinder, and means to rotate each of said valves and cause it to alternately present opposite ends of its port toward the ignition chamber.

In testimony whereof I affix my signature, in the presence of two witnesses.

CYRUS E. MEAD.

Witnesses:

MAY A. MADDEN,

HENRY SOUTHER.